United States Patent Office 2,744,819
Patented May 8, 1956

2,744,819

METHOD FOR THE CONTROL OF UNDESIRED GRASSES

Burton V. Toornman, Scotts, Mich., assignor to The Dow Chemical Company, Midland, Mich., a corporation of Delaware No Drawing. Application October 13, 1954,
Serial No. 462,102

6 Claims. (Cl. 71—2.6)

This invention relates to a method for the control of undesired grasses and is particularly directed to a method for the selective control of annual gramineous weeds.

In recent years a variety of chemical herbicides have been developed for the solution of a number of agricultural problems. For example, agents are being marketed for the control of broad-leaved weeds in the presence of narrow-leaved crops such as the cereals and sugar cane. Also successful chemical control of narrow-leaved weeds in the presence of certain broad-leaved crops has been reported. However, a major problem, not previously solved, is presented where narrow-leaved weeds infest plantings of desirable narrow-leaved species. Thus, wild oats are a major pest in the wheat fields of the Northern Plains States and crab grass constitutes a problem in lawns and crops.

It is an object of the present invention to provide a novel method for the control of undesired annual grasses. It is a further object to provide a method for the selective control of annual grass weeds in the presence of desirable plant species. Further objects will become apparent from the following specification and claims.

According to the present invention it has been discovered that 4-chlorophenyl 4'-chlorobenzenesulfonate when distributed so as to contact the seed of annual grasses positioned in the soil suppresses the germination and growth of such seed. It is among the advantages of the invention that the suppression of undesired annual grasses is accomplished without appreciable injury to established plants or to the seed of many desirable plant species. Surprisingly, it has been found that annual grass weeds such as wild oats can be suppressed in spring and winter wheat with only minimal injury to the latter.

In carrying out the invention, it is essential to distribute a growth-inhibiting amount of the active sulfonate material in the soil in close proximity to the seed of the plants to be controlled. In practice it is usually advantageous to employ a liquid or finely-divided solid carrier to facilitate the uniform distribution of the sulfonate in the soil. In one mode of operation a composition containing 4-chlorophenyl 4'-chlorobenzenesulfonate is sprayed or dusted onto the surface of the soil and thereafter mixed into the upper layers of the soil in any suitable fashion, as for example, with a disc and drag combination. Alternatively, the active sulfonate may be washed into the germination zone by overhead irrigation following application to the soil surface as set forth above. In one preferred method of operation, and particularly in the treatment of stands of desirable vegetation infested with annual grass seed, the sulfonate is applied in the form of an aqueous emulsion using sufficient of the aqueous carrier to accomplish the distribution of the toxicant through the desired cross-section of the soil.

The exact depth of soil to be treated will vary depending upon the type of soil and the particular species of plant to be controlled. For example, the seed of crab grass (*Digitaria sanguinalis*) rarely germinate if positioned at a depth of more than half an inch in the soil. For the control of crab grass, therefore, the distribution of the sulfonate compound in a growth inhibiting amount through the upper one-half to one inch of the soil serves to accomplish substantially complete control. On the other hand, the seed of certain other annual grass weeds such as wild oats may germinate from a depth of 3 to 5 inches in certain soils. For the control of such grasses, the sulfonate toxicant is distributed through the upper 3 to 6 inches of the soil.

In general, any of the conventional types of herbicidal formulations can be employed for the distribution of the 4-chlorophenyl 4'-chlorobenzenesulfonate toxicant in accordance with the present invention. Dusts may be prepared by grinding together the sulfonate and a finely divided inert carrier such as talc, pyrophyllite, diatomaceous earth or clay. Similarly, the sulfonate toxicant may be ground together with both a finely divided inert carrier, as set forth above, and suitable wetting and dispersing agents such as alkyl aryl sulfonates, aryl polyether alcohols, lignin sulfonates, long chain alkyl sulfates and sulfonates and the like to produce wettable powder compositions adapted for the preparation of aqueous dispersions of the toxicant. A preferred composition comprises an aqueous dispersion of a liquid emulsifiable concentrate containing the sulfonate toxicant. Such concentrates may be prepared by dissolving together the sulfonate toxicant and an oil soluble emulsifying agent in a solvent such as toluene, xylene, chlorinated hydrocarbons or solvent oils obtained from the refining of petroleum.

The amount of the sulfonate toxicant to be employed will vary depending upon such factors as the type of soil, moisture conditions, temperature and the variety of plant to be controlled. In general, good results are obtained when the sulfonate is distributed at a rate of from about 5 to 40 pounds or more per acre and through such a cross-section of the soil as to provide for the presence therein of an effective concentration of the treating agent. In such applications it is desirable that the compound be distributed to a depth of at least 0.25 inch and at a dosage of at least 5 pounds per acre-inch. In applications for the selective control of wild oats in wheat it is preferred to employ from about 10 to 20 pounds of the sulfonate per acre distributed through the upper 3 to 6 inches of the soil to provide a dosage of from about 10 to 40 parts by weight of the sulfonate per million parts of soil.

The following examples illustrate the invention but are not to be construed as limiting the same:

*Example 1*

21.75 parts by weight of a commercial 4-chlorophenyl 4'-chlorobenzenesulfonate product containing 92 percent by weight of said sulfonate and 8 percent of inert ingredients was dissolved in a mixture of 73.25 parts by weight of xylene and 5 parts of a dimeric alkylated aryl polyether alcohol (Triton X–155) to prepare a liquid emulsifiable concentrate composition. The latter was dispersed in water to prepare an aqueous emulsion spray composition containing 4.6 pounds of the sulfonate per 100 gallons of solution. This spray composition was applied with a pressure sprayer to an area of established blue grass lawn in central Michigan in late May, when crab grass (*Digitaria sanguinalis*) had not yet emerged, although the treated area was known to be heavily infested with crab grass seed. The application was carried out at the rate of 435 gallons of the spray composition per acre to provide a dosage of 20 pounds of 4-chlorophenyl 4'-chlorobenzenesulfonate per acre. Adjacent areas of the lawn were left unsprayed to serve as checks. The weather following the application was warm and moist and crab grass emerged in the untreated areas about 9 days after the treatment. Inspection of the treated and untreated areas about one month after treatment showed 95 percent control of crab grass in the treated area with no observable injury to the established lawn grass. In the check areas crab grass was growing profusely and vigorously.

*Example 2*

20 parts by weight of 4-chlorophenyl 4'-chlorobenzenesulfonate and 5 parts of the alkylated aryl polyether alcohol of Example 1 were dissolved in 75 parts of xylene to prepare a liquid emulsifiable concentrate composition. The latter was dispersed in water to produce an aqueous emulsion composition containing 0.213 pound of the sulfonate per 100 gallons. This emulsion composition was applied as a soil drench at the rate of 0.434 acre-inch of composition per acre of soil to areas of fertile sandy loam previously planted with seed of winter wheat, radish and wild oats. The above procedure resulted in the application of the sulfonate at the rate of 25 pounds per acre distributed through about 3 inches of soil to provide a dosage of about 41 parts by weight of the sulfonate per million parts of soil. Similarly planted areas of soil were maintained untreated to serve as checks. About 3 weeks after the application, it was observed that the seeded species had emerged and were growing vigorously in the untreated check areas. In the treated areas wheat plants were growing in number and vigor substantially equal to that of the checks and radish plants to the extent of about 85 percent of the checks. In the treated areas there was essentially no growth of wild oats.

*Example 3*

25 parts by weight of 4-chlorophenyl 4'-chlorobenzenesulfonate and 10 parts of Triton X-155 were dissolved in 65 parts of xylene and the resulting emulsifiable concentrate dispersed in water to prepare an emulsion composition containing 0.45 pound of the sulfonate per 100 gallons of aqueous composition. The latter was applied as a soil drench to areas of sandy loam soil previously planted with seed of millet, wheat, barley, rye, timothy, crab grass, foxtail, onions, corn, soybeans, buckwheat, cranberry beans, peas, cotton, radish, cucumber and flax. This application was at the rate of 0.163 acre-inch of composition per acre to provide a dosage of 20 pounds of sulfonate per acre distributed through about 1.5 inches of soil. This dosage corresponds to about 64 parts by weight of the sulfonate per million parts of soil. Similar areas of soil, planted to the same varieties of seed were left untreated to serve as checks. All areas were maintained under conditions of temperature and soil moisture favorable to the emergence and growth of the seed. On observation about one month after the planting, it was found that all the plant species in the untreated check areas had emerged well and made vigorous growth. In the treated areas wheat, barley, rye, onions, corn, soybeans, buckwheat, cranberry beans, peas, cotton, radish, cucumbers and flax showed emergence and growth equal to that of the corresponding species in the untreated check areas while foxtail showed growth only to the extent of 10 percent of the checks and there were no living plants of millet, timothy and crabgrass.

I claim:

1. A method for the control of annual grass weeds which comprises distributing 4-chlorophenyl 4'-chlorobenzenesulfonate in intimate admixture with the soil in close proximity to annual grass seed under ambient conditions normally leading to the germination and growth of such seed, said sulfonate being employed in amount sufficient to suppress the growth of said seed.

2. The method of claim 1 in which the sulfonate is employed in the amount of at least 5 pounds per acre-inch of soil.

3. A method for the control of annual grass weeds which comprises contacting the seed of such grasses, while positioned in soil under conditions normally leading to the germination and growth of said seed, with 4-chlorophenyl 4'-chlorobenzenesulfonate in amount sufficient to suppress the growth of said seed.

4. A method for the control of undesired annual grasses in established turf which comprises distributing 4-chlorophenyl 4'-chlorobenzenesulfonate in the upper layer of the soil in which the turf is growing, said sulfonate being employed at a dosage sufficient to suppress the growth of annual grass seed without adversely affecting the established turf.

5. A method according to claim 4 in which the sulfonate is distributed in the form of an aqueous emulsion containing sufficient of the aqueous carrier to accomplish the distribution of the sulfonate toxicant through at least the upper 0.25 inch of the soil.

6. A method for the control of undesired annual grasses in soil seeded to desired crops and infested with seed of said grasses which comprises distributing 4-chlorophenyl 4'-chlorobenzenesulfonate in intimate admixture with at least the upper 0.25 inch of the seeded soil, said sulfonate being employed in an amount sufficient to suppress the growth of annual grasses without adversely affecting the germination and growth of the desired crop.

References Cited in the file of this patent

UNITED STATES PATENTS 2,678,878     Stewart _____ May 18, 1954